Patented Sept. 9, 1952

2,610,167

UNITED STATES PATENT OFFICE 2,610,167

PIGMENTED SILICONE ELASTOMERS

Theodore A. Te Grotenhuis, Olmsted Falls, Ohio

No Drawing. Application December 7, 1946,
Serial No. 714,919

18 Claims. (Cl. 260—37.5)

The present invention is a continuation-in-part of my application Serial No. 585,824, filed March 30, 1945, and relates to the preparation of silicone elastomers. It is particularly concerned with a process of reinforcing such silicone elastomers to provide increase in strength and other properties.

It is well-known that silicone elastomers or silicone rubbers with which the present invention is primarily concerned are able to withstand temperatures which are destructive to other elastomers. They heretofore have had exceptionally low tensile strength, which rarely, if ever, exceeded 600 or 700 lbs./sq. in., even when compounded with the most desirable filling materials available. It has not been possible prior to my present invention to obtain reinforcement of silicone rubbers with carbon black, either because the carbon black has little affinity for the inorganic portion of the silicone or because the carbon black tends to absorb the curing agents necessary for curing of the silicone elastomers, or because of both of these reasons.

It is an object of the present invention to provide a method of compounding silicone elastomers to obtain a high temperature-resistant material having improved properties.

It is another object of the present invention to provide a method of compounding organosilicone elastomeric material wherein pigments are utilized to obtain substantial reinforcement.

It is a further object of the present invention to provide a carbon black compound of silicone elastomers or silicone rubbers having substantially improved properties over those heretofore produced and which can be cured or vulcanized.

It is still another object of the present invention to provide a pigment-reinforced silicone rubber which may be cured or vulcanized to the elastic state, giving tensile strengths in excess of 1,000 lbs./sq. in.

In my aforementioned prior application, I described among other things the treatment of pigment with an organosilicon compound having a hydroxyl reactive group and the preparation of rubbery and resinous material containing such pigments polymerized in place, etc. The present invention is primarily restricted to the silicone elastomers, etc., and their preparation.

In accordance with the present invention, the above and other objects, which will be apparent from the following description of the invention, may be accomplished by incorporating in the silicone polymer finely divided solid materials or pigments having organic groups connected through silicon atoms to the surface of the pigment. The organic groups may be connected to the pigment by separately treating the pigment with a water-hydrolyzable or hydroxy-reactive organosilicon compound, i. e., a silicon compound capable of condensing or adding to hydroxyl groups, and the thus treated pigment thereafter mixed into the silicone elastomer. Preferably, however, the pigment is incorporated into the elastomer before or during the preparation, condensation, or polymerization thereof. It may be mixed into the monomeric materials used in forming the elastomer while they are in the liquid state, and retained therein during the subsequent polymerization or condensation reaction. The pigment, which may or may not have been previously exposed to a reactive organosilicon compound of a type capable of reacting with a hydroxyl group, is thoroughly saturated or has its surfaces thoroughly reacted during the reaction or subsequent polymerization or condensation to the rubbery state, so that it has little, if any, tendency to absorb curing agents and the like. In addition, it may have that intimate contact with the rubbery matrix only obtainable when the matrix has been fluid while in contact with the pigment.

The surfaces of most pigments, including even carbon black, surprisingly contain groups (apparently contain hydroxyl or carboxyl groups) which are capable of reacting with hydroxyl-reactive organosilicon compounds such as the hydrolyzable organosilicon halides, including the hydrolyzable alkylsilicon halides, the hydrolyzable arylsilicon halides, etc., the organosilicon amines, including the alkoxysilicon amines, etc., and to some extent even the organosilicates such as ethyl orthosilicate and the like, to form a chemical linkage to the surface of the pigment, as evidenced by the fact that pigments suitably treated with these materials are no longer readily wettable by water but will float thereon. The organosilicon groups attached to the surface of the pigment, when provided with a plurality of hydrolizable groups or hydroxyl-reactive groups, may be condensed with the silicone monomeric materials or the silicone elastomers to form direct linkages to the pigment surfaces.

In the prepartion of rubbery silicone elastomers it is desirable to have only monomeric materials that are capable of condensing bifunctionally, i. e., have only two groups that can combine with hydroxyl groups, so that the polymer will grow by condensation in only two directions and form long chains to give an elastic product. A compound with but one condensable or hydrolyzable group stops chain growth, and a compound with more than two such condensable groups, when present in a substantial amount, may cause cross linking with enhancement of resinous properties as distinguished from rubbery properties. When the hydroxyl groups on the pigment surface are reacted with the silicone compounds containing only two hydroxyl reactive groups, direct attachment can only be had to the pigment particles at the ends of polymer chains made up of the condensed bifunctionally reactive silicones. When the hydroxyl group on the pigment surface is reacted with compounds containing three or four hydrolyzable groups, or groups condensable with hydroxyl groups, even if one or two such groups are utilized for reaction with the pigment surface, the attached silicone group may still enter any part of bifunctionally growing chains. For this reason it is frequently desirable, even when the pigment is incorporated into the liquid polymerizable materials which are to form the silicone elastomers, to expose the pigment surface to the direct action of compounds (preferably in vapor phase) having more than two groups capable of condensing with hydroxyl groups. Thus, contact of the surface of the pigment with a silicon trichloride, preferably an alkyl trichlorosilane, or when the pigment is later to be incorporated into the silicone monomer, even silicon tetrachloride (tetrachlorosilane) is beneficial, particularly for the finer, highly adsorptive pigments such as carbon blacks, etc.

The treatment of the surfaces of the pigment or the condensation of the monomer in the presence of the pigment, or both, tend to saturate the adsorptive capacities of the pigment so that a curable rubber is obtained.

The pigments which provide the greatest improvement in properties of the elastomeric materials have relatively great surface areas and of all pigments carbon black is preferred in that it gives exceptional properties to the polymer when it is incorporated therein, in accordance with the present invention. Colloidal silica, such as that prepared by burning ethyl silicate and collecting the residue by suitable electrostatic precipitation means, is desirable. Examples of other pigments which may also be present include zinc oxide, titanium dioxide, etc., coloring materials such as lead chromate, antimony sulfide, iron oxide and the like. One or more of these pigments may also be incorporated into the rubbery polymer, preferably after treating it with a suitable reactive silicone, to change the characteristics of the surface thereof. Such pigments may be used in conjunction with the exceedingly finely divided pigments, such as the carbon black, silica, or silicic acid mentioned above.

The silicone elastomers of the type with which the present invention is primarily concerned may be prepared by any suitable way, as, for example, by any of the methods described in the copending application of Maynard C. Agens, Serial No. 526,573, and the copending application of James G. E. Wright and Curtis S. Oliver, Serial No. 526,472, both of which applications were filed on March 14, 1944.

They may be prepared by treating a dimethyl silicone having a methyl to silicon ratio as near 2.00 as practicable, i. e., ordinarily between 1.98 and 2.00 and consisting essentially of dimethyl substituted silicon atoms, with a suitable condensing agent such as ferric chloride hexahydrate to convert the liquid silicone to a gum which may later be vulcanized by a suitable vulcanizing agent such as benzoyl peroxide or other suitable strong oxidizing agent, etc.

The organosilicon dihalides, such as the dimethyldichlorosilane, are generally the preferred starting materials. These are hydrolyzed by suitable hydrolyzing procedures to obtain a polymerizable or condensable silicone oil which is condensed with a condensing agent, such as the aforementioned ferric chloride hexahydrate, to convert it to a gum.

Generally the hydrolysis of the diorganosilicon dihalides (preferably dimethyl dichlorosilane) should take place at relatively low temperatures, such as zero degrees centigrade or below, as may be accomplished by mixing the silicon compound into an ice and water mixture with or without solvent or diluent, such as butanol, ethyl ether, and mixtures of one or more of these with benzene, toluene, etc. The hydrolyzable organosilicon dihalide may be diluted with solvent such as anhydrous ether, toluene, etc., prior to the hydrolysis which replaces the two chlorines with hydroxyl groups. The silicon oil recovered from the hydrolysis is condensed with any suitable condensation catalyst, such as ferric chloride hexahydrate, for forming an elastomer. The conditions for the condensation, forming and curing of the rubbery silicone elastomers are described in detail in one or more of the aforementioned patents and applications.

When the pigment is treated, prior to its addition to the monomeric materials utilized for forming the silicon elastomer, any organosilicon compound having an amino group, a halogen group, or other group capable of condensing with hydroxyl, may be utilized for treating the pigment. As above stated, however, the organosilicon halides are preferred because of the ease with which they react with hydroxyl groups to bond the silicon atom to the surface of the pigment through oxygen linkage.

Because they have no carbon-to-carbon bond, methyl groups are the most desirable of the organic groups in the hydroxyl-reactive silicon compounds. Such compounds having one or more organic groups selected from hydrocarbon or nonhydrocarbon groups, either aromatic, aliphatic, or araliphatic, heterocyclic, etc., may, however, be used to give substantial benefits in accordance with the present invention. Because of the great strength of the carbon-to-silicon bond, in order to withstand relatively high temperatures it is preferred that a carbon atom of the organic group be connected directly to the silicon atom. Organic compounds such, for example, as diethoxy diamino silane, and other alkoxy amino (or halo) silanes having alkoxy or organic groups linked to silicon through an oxygen atom, in addition to the readily hydrolyzable groups, also are effective. Of all these combinations the methyl silicon halides are preferred as aforementioned, because of their reactivity and because the methyl silicon is able to withstand much higher temperature than compounds having a carbon-to-carbon bond.

Examples of suitable organo-substituted silicon halides which may be used for treating pigments are: the alkyl-substituted silicon chlorides such as mono-, di- and trimethyl, ethyl, propyl, butyl, and lauryl silicon chlorides, etc.; the alkylenyl silicon halides such as mono-, di- and trivinyl, allyl, butenyl and dodecyclenyl silicon halides, etc., having two to twenty carbon atoms in at least one organic group; the alkylenyl alkyl silicon chlorides such as allyl dimethyl silicon chloride, diallyl methyl silicon chloride, allyl methyl silicon dichloride, vinyl allyl methyl silicon choride, and allyl dimethyl silicon bromide, etc., having at least one halogen and at least one unsaturated group of two to twenty or more carbon atoms attached to silicon; the aryloxy or alkoxy silicon halides such as ethoxy silicon chloride and ethoxy diethyl silicon chloride; the alkoxy aliphatic-, alkyleneoxy aliphatic-, aryloxy aliphatic-, aryloxyaryl- and aliphatic-oxyaryl silicon halides such as butoxyethyl dimethyl silicon chloride, ethoxymethyl dimethyl silicon chloride, allyloxyethyl dimethyl silicon chloride, allyloxylauryl silicon trichloride, allyloxyphenyl dimethyl silicon chloride and phenoxyphenyl methyl silicon dichloride, etc.; the halogen alkylenyl or haloalkyl silicon halides including chloroethylenyl dimethyl silicon chloride (chlorovinyl dimethyl silicon chloride), chloroethyl dimethyl silicon chloride and di(chloroallyl)methyl silicon chloride, etc.

In the treatment of pigments to react with organic silicon compounds such as aforementioned, it is preferred to suitably deagglomerate the pigment in the hydroxyl reactive silicon compound. The deagglomeration may take place during the preparation of the pigment, as by grinding or micro pulverizing the pigment in a relatively dry atmosphere of gaseous highly reactive organic compound such as a silicon halide as aforementioned, or by suitably ball milling or dispersing the pigment in an anhydrous liquid free from hydroxyl and comprising the reactive silicon compound.

When as above pointed out the pigment with or without pretreating is incorporated into the hydroxyl reactive monomeric material such as the liquid dimethyl-silicon dihalide or when the pigment treated as above described is incorporated into the oil produced by hydrolyzing this material, it is preferably dispersed therein by grinding with the monomeric material to produce a suitable dispersion. The grinding is preferably accomplished in a ball mill or by passing the rough mix of pigment and liquid condensable material through a colloid mill, so-called micropulverizer, etc., which subjects the pigment to shear in the presence of the condensable or hydrolyzable and condensable polymer forming liquid material.

Dispersion of a pigment such as carbon black in the silicone oil is facilitated by thickening the oil as by incorporating therein a soluble or miscible polymeric silicone, such for example as the fluid (preferably viscus) or the soluble, solid polymeric aliphatic silicones, including the methyl and ethyl silicones, aryl silicones including the phenyl silicones and mixtures such as polymeric silicones. The dispersion is also facilitated by incorporating with the pigment monomeric material mixture (with or without the polymeric silicone) during grinding thereof a relatively small amount, such as about .1 to 10% of the weight of the pigment, a suitable antiagglomerating agent. Antiagglomerating agents are particularly effective after the pigment or carbon black has been treated with organosilicon compounds reactive with hydroxyl groups.

In determining the relative suitability of antiagglomerating agents for the particular pigment to be dispersed in the silicone oil, the pigment (preferably treated as in Example 1 hereof with a hydroxyl-reactive organosilicon compound) is mixed with only sufficient monomeric material to form a stiff puttylike paste. The effectiveness of the antiagglomerating agent for the particular pigment in the silicone oil is readily apparent by applying a gram or two of this paste and a small amount of the proposed antiagglomerating agent on a glass plate and working it with a spatula. An effective antiagglomerating agent will almost immediately cause a marked increase in fluidity and an increase in jetness, showing improved dispersion.

The antiagglomerating agents soluble in silicone oils have more dispersing effect, and of these materials the cationic agents appear to be most efficient. Examples of these antiagglomerating agents that are particularly desirable are the soluble phosphatides and substituted amides of alkyl phosphates having ten to twenty carbon atoms, such as the substituted amide of alkyl phosphate (twelve carbons) and the substituted amide of alkyl phosphate (eighteen carbons), sold respectively under the trade name Cationic Agent "C" and Cationic Agent "D" by Victor Chemical Works.

*Example 1*

100 grams of unbeaded carbon black are subjected to agitation in the presence of a vapor from about one gram of a mixture of mono-, di- and trimethyl silicon chlorides obtainable under the trade-name "Dryfilm" from The General Electric Company. The agitation is continued in the presence of the alkyl silicon halide for about ten minutes to allow thorough penetration of the vapor. The hydrochloric acid formed by the reaction may be removed in any suitable manner, as for example by heating at elevated temperature, by neutralizing with an alkaline material such as dry $NH_3$, by shaking the carbon black with water (washing), or preferably by treating the carbon black with ether and water and washing the carbon black-ether mix until free from acid. The carbon black thus treated has much less tendency to be wet by water and much greater tendency to be wet by hydrocarbon organic solvents.

*Example 2*

When titanium dioxide is substituted for carbon black in Example 1, and agitation continued in like manner, it is also more readily dispersed in organic liquids.

*Example 3*

Into 300 parts by weight of a liquid consisting essentially of dimethyl silicon dichloride, but containing a small percentage of methtyl silicon trichloride and about 5 or 10 parts of a soluble polymeric silicone to act as a thickening agent, is incorporated about 20 to 25 parts of carbon black. Moisture or OH groups on the carbon black immediately reacts with a portion of the silicon halide with apparent bonding of organosilicon groups to the surface of the carbon black particles. This is evidenced by the fact that they become unwettable by water on contact with organosilicon halide liquid or vapor.

The slurry thus had may be ground in a ball mill under substantially anhydrous conditions to at least partially disperse the carbon black. The remaining silicon halide of the mixture is then converted into organic silicon hydroxy compounds, as by treatment with cracked ice. By shaking the mixture with an organic solvent for the silicon compounds such as ether, the hydroxy organosilicones (organosilicols) as well as most of the treated carbon black are readily separated from the aqueous material. This is due to the fact that the carbon black is more readily wetted by the ether than by the water and due to the solubility of the silicon hydroxy compound in the ether. After washing the ether free of acid, it is concentrated by vaporization at slightly elevated temperatures. A viscous liquid suitable for adhesives and surface coatings is obtained. By further heating at elevated temperatures, preferably in the presence of 1 to 5% of an alkyl borate, such as triethylborate, resinous bodies of the desired flexibility and hardness may be obtained, which bodies contain the carbon black therein.

*Example 4*

Carbon black treated as in Example 1 with a mixture of mono-, di- and trimethyl silicon chlorides is agitated with cold water to remove the hydrochloric acid formed by reaction. It is then stirred into the washed ether solution of a hydrolysis product obtained by hydrolizing a mixture of dimethyl silicon dichloride and methyl silicon trichloride with cracked ice as in the preceding example. The amount of carbon black used is about 10% or 14%, or even considerably more of the weight of the original alkyl silicon halide. After concentrating the ether solution containing carbon black, the ingredients are incorporated in a closed ball mill and ground with heating up to 80° or 100° C. to faciliate dispersion of the carbon black and simultaneous condensation of the methyl silicon hydroxides to a silicone polymer of the desired consistency.

*Example 5*

Thirty parts of carbon black treated as in Example 1 with a mixture of mono-, di- and trimethyl silicon chlorides is agitated with cold water to remove the hydrochloric acid formed by the reaction. The product is then stirred into 100 parts of silicon oil obtained by hydrolyzing a substantially pure dimethyl silicon dichloride at low temperature.

The mixture thus obtained is ground in a ball mill for a few hours to produce a dipersion of the carbon black in the silicon oil. The dispersion is improved and rendered more fluid by the addition of a relatively small amount, say about 5%, (based on the weight of the polymerizable or condensable silicone oil) of a soluble oily silicone polymer of diethylsilicone and about 1% of the aforementioned relatively long chain organic amino compound sold under the trade name "Cationic Agent C." The silicone oil-carbon black mixture thus prepared is condensed to a rubbery state with a suitable condensing agent, such as ferric chloride hexahydrate. The polymer thus obtained after mixing with a vulcanizing agent or oxidizing agent, such as about four parts of an organic peroxide and curing for several hours at elevated temperatures of about 150° C., as mentioned in the aforementioned applications, has exceptional high strength compared to silicone rubbers which do not contain the carbon black, indicating much reinforcement by the carbon black.

The carbon black used in the above Example 5 may be substituted by treated or untreated carbon black and may be stirred or dispersed directly into the dimethyl silicon dichloride and the entire mixture subjected to the hydrolyzing treatment to produce the silicone oil which may be polymerized en masse in the presence of a suitable condensing agent, such as ferric chloride hexahydrate, etc., as set forth in one or more of the aforesaid applications, to form the rubbery polymer which is then compounded with a curing agent, such as a toluene solution of about 3% based on the polymer of benzoyl peroxide, and cured at elevated temperature to produce a reinforced rubber of high tensile strength. When, on the other hand, untreated carbon black is simply milled into the silicone elastomer, the curing usually is substantially prevented for some reason, probably because of absorption of curing agents.

If desired, the reinforcing pigment, such as carbon black, may be wetted with a hydroxyl-reactive silicon compound, preferably a diorganosilane such as the dimethyldichlorosilane, or a solution in nonreactive solvent such as toluene, etc. of hydroxyl-reactive organo silane, or as a halosilane, or dimethyl dichlorosilane, and then the wet mixture masticated into a mass of silicone rubber, which may or may not be vulcanized. The carbon black is preferably wetted with the hydroxyl-reactive silicon compound a substantial time before the mix is incorporated into the polymer to insure complete saturation of adsorptive tendencies of the carbon black. Unreacted hydroxyl-reactive groups of the dimethyl dichlorosilane, etc., in the carbon black mixture, function both to reclaim and reinforce the vulcanized silicone. The following examples illustrate this feature:

*Example 6*

Sixty grams of unpelletized channel black (W6) are mixed with 100 grams of a 15% solution of dimethyl dichlorosilane in anhydrous toluene. The wet mixture is allowed to stand for at least one hour and then slowly milled into 100 grams of a rubbery silicone elastomer prepared in the ordinary way by condensing a dimethyl silicone oil having a methyl-to-silicon ratio of approximately two in the presence of ferric chloride hexahydrate until a gumlike mass is obtained. During the initial mixing of the wet mixture into the rubbery polymer the mix is maintained at about room temperature (or preferably below) by cold water in the mill rolls. The milling is continued very slowly on a tight mill at elevated temperature until a major portion of the solvent and volatile matter is dissipated. About 3% of benzoyl peroxide is then added and the milling continued for around five minutes. The product is molded and cured for several hours and exhibits strength and elasticity much higher than articles cured from silicone rubber without the carbon black addition.

If desired, the hydrochloric acid may be washed out of the silicone polymer after the wet carbon black addition by addition of water with the polymer on washing rolls. The product is then dried, further compounded with the vulcanizing agent, and then cured.

*Example 7*

When in the above Example 6 the silicone rubber is a cured silicone elastomer, it is masticated on mixing rolls until torn apart and then mixed with the carbon black dimethyldichlorosilane toluene mixture prepared as above and preferably having an excess of dimethyldichlorosilane over and above that which reacts with the carbon black. The resultant product after curing also has exceptionally desirable properties.

While methyl halosilanes are preferred for treating carbon black, etc., other hydroxyl reactive silicon compounds may be used as aforementioned. Compounds containing no carbon-to-carbon bonds are usually required when the compounds are to stand the highest temperatures.

Any solvent for the polymer that is free from groups reactive with the silicon and polymer may be used in place of the toluene in the above Examples 6 and 7.

In the above examples the curing agents are not absorbed by the carbon black and a relatively highly reinforced polymer is produced. The dry treated carbon black of Example 1, with or without washing, may be incorporated into the silicon elastomer direct and, while the strength of the rubber produced is not as great as that in the preceding examples, it is much improved over those of silicon rubbers which are not compounded with carbon black, and is much superior to silicon rubbers compounded with untreated carbon black and hence not curable by known means. In place of the carbon black, other pigments, as aforementioned, especially those having a surface area in excess of 30 square meters per gram, may be used to obtain desirable results.

The amount of pigment used depends, as is well-known by rubber compounders, on the particular pigment, the hardness and the tensile strength desired in the vulcanized product. The amounts used are therefore variable over wide limits. In the case of very fine pigments, such as black or white carbon blacks, which have a surface area of 25 or more square meters per gram, at least 15 parts per 100 parts of the elastomer are usually required for much reinforcing effect and about 25 or 30 parts to about 60 or 70 parts are usually preferred. More than 100 parts per 100 parts of elastomer may be objectionable in many instances. In the case of pigments having larger particle size, such as pigments having a surface area of less than 20 square meters per gram, as much as 200 or even 300 parts may be used and a very small amount may be found to give desirable effects.

It is pointed out above that the pigments are treated to modify their surface characteristics by contact with a fluid-reactive silicon compound, such as the amino and halosilanes, which have a group capable of reacting or condensing with hydroxyl groups to split out hydrochloric acid, ammonia, water, etc. It is preferred that these silicon compounds have an organic group attached to the silicon atom, but, as aforementioned, substantial effects can be obtained, particularly with a process similar to that disclosed in Example 7 above, when the amount of silane is substantially limited to that which can react with the surfaces of the carbon black or pigment, with a hydroxyl-reactive silicon compound, such as silicon tetrachloride, which does not contain organic groups. Excess of such material is undesirable because of its marked cross linking nature.

The treatment of carbon black with the more reactive silicon compounds, such as those containing amine or halogen groups linked directly to silicon, produces a more rapid modification of the carbon black and saturation of its absorptive tendencies by mere contact with the carbon black, but a prolonged period of contact between the carbon black and the less reactive fluid organosilicon hydroxides, as occurs during polymerization of those materials to the rubbery state, also has a very substantial tendency to saturate the absorptive tendencies of the black so that a cured rubbery silicone article may be had.

Pigments having vinyl groups attached to their surfaces through silicon are claimed in my copending application, Serial No. 251,152, filed October 12, 1951.

It is also apparent that modifications of the invention may be made without changing the spirit thereof, and it is intended that the invention be limited only by the appended claims.

What we claim is:

1. A carbon black-reinforced dimethylsilicone elastomer containing carbon black, surface portions of which are modified by the residue from the hydrolysis of a hydrolyzable organo-silane.

2. In a method of compounding a vulcanizable diorganosilicone elastomer, the steps which comprise treating a carbon black to modify its surface characteristics with a fluid comprising a silicon compound containing attached directly to silicon a water-hydrolyzable group, said silicon compound being selected from the group consisting of silicon tetrahalides and organo-silicon compounds and mixing the thus treated carbon black with said vulcanizable silicone elastomer, whereby the absorptive capacity of said carbon black to curing agents in said elastomer is reduced.

3. In a method of compounding a rubbery diorganosilicone elastomer, the steps which comprise mixing carbon black with a hydrolyzable organo halosilane-containing composition, and thereafter mixing the thus treated carbon black into said vulcanizable silicone elastomer.

4. In a method of compounding an elastomeric condensation product of a hydrolyzed hydrolyzable organosilicon compound containing only two hydrolyzable groups attached directly to a silicon atom, the steps which comprise mixing a carbon black with a solution of a hydrolyzable methylhalosilane, and thereafter mixing the carbon black-solution mix into said condensation product.

5. A dimethylsilicone elastomer comprising a polymerized dimethylsilicone oil having a methyl-to-silicone ratio of about two and comprising a carbon black modified by contact with a hydrolyzable fluid organo halosilane.

6. A method of treating a vulcanized dimethylsilicone elastomer which comprises mixing with said elastomer a mixture of carbon black and a hydrolyzable organic halosilane.

7. In a method of preparing a reinforced dimethylsilicone elastomer wherein a pigment having a surface area in excess of 20 square meters per gram is incorporated in said elastomer, the step which comprises subjecting said pigment to a fluid dimethylsilicon compound prior to incorporating it into contact with said elastomer, said silicon compound having attached directly to a silicon atom in addition to methyl groups an inorganic group which is free of carbon that condenses with hydroxyl groups, whereby the adsorptive capacity of said pigment for said curing agent is reduced, said silicon compound being one which reacts with hydroxyl groups through said inorganic carbon free group to form a product having a Si-O bond.

8. The method of claim 7 wherein the fluid silicon compound is a hydrolyzable halosilane.

9. In a method of preparing a carbon black-reinforced dimethylsilicone elastomer, wherein a curable dimethylsilicone elastomer is mixed with carbon black and the mixture cured and vulcanized, the steps which comprise deagglomerating said carbon black in the presence of an organosilicon compound containing attached directly to a silicon atom thereof besides an organic group an inorganic group which is free of carbon and which reacts with hydroxyl groups, and incorporating the thus treated black into said elastomer, said organosilicon compound being one which reacts with hydroxyl groups through said hydroxyl reactive group to form a Si-O bond.

10. The method of claim 9 wherein the deagglomeration is accomplished by grinding the carbon black in the presence of a fluid comprising a hydrolyzable methylsilicon halide.

11. A composition comprising a vulcanizable rubbery dimethylsilicone elastomer and distributed through said elastomer a pigment having a surface area of over 20 square meters per gram, which pigment has on surface portions thereof a residue from the treatment of said pigment with an organosilicon compound containing attached to silicon one inorganic hydroxyl-reactive group which is free of carbon and one organic group not reactive to water, whereby the surface characteristics are modified and tendency for adsorption of curing agents is materially reduced, said organosilicon compound being one which reacts with hydroxyl groups through said hydroxyl reactive group to form a Si-O bond.

12. A composition according to claim 11 wherein said pigment is a finely divided silica having a surface area of over 30 square meters per gram and said pigment is dispersed through said elastomer.

13. The composition of claim 11 wherein said rubbery condensation product consists essentially of dimethyl silicon oxide units and said pigment is a finely divided silica having a surface area of more than 30 square meters per gram, and wherein the organo-silicon compound has two hydroxyl reactive groups and is free of carbon-to-carbon bonds.

14. The composition of claim 11 wherein said rubbery condensation product consists essentially of dimethyl silicon oxide units, and said pigment is a finely divided silica having a surface area of more than 30 square meters per gram, and wherein the organo-silicon compound has two hydroxyl reactive groups.

15. The product of claim 11 wherein said hydroxyl reactive groups which are split off with H from contacting —OH to form a new silicon-oxygen bond are NH₂ groups, and wherein said pigment is an inorganic pigment which is substantially free of elemental carbon and which has a surface area of over 30 square meters per gram.

16. A composition comprising a vulcanizable di-organosilicon elastomer having dispersed therethrough a finely divided silica which has on surface portions thereof a residue from the treatment of said pigment with a silicon compound containing attached directly to silicon a water-hydrolyzable group, said silicon compound being selected from the group consisting of silicon tetrachloride and organo-silicon compounds.

17. A composition according to claim 11 wherein said pigment is a finely divided silica and said organic group attached to silicon is an alkyl group.

18. A composition according to claim 11 wherein said pigment is a finely divided silica having a surface area over 30 square meters per gram and wherein said residue on the pigment surface comprises a

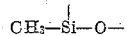

group.

THEODORE A. TE GROTENHUIS.

REFERENCES CITED

The following references are of record in the file of this patent:

UNITED STATES PATENTS

| Number | Name | Date |
|---|---|---|
| 2,306,222 | Patnode | June 22, 1942 |
| 2,424,853 | Safford | July 29, 1947 |
| 2,448,756 | Agens | Sept. 7, 1948 |
| 2,452,416 | Wright | Oct. 26, 1948 |
| 2,460,795 | Warrick | Feb. 1, 1949 |
| 2,486,674 | Pedersen | Nov. 1, 1949 |
| 2,510,661 | Safford | June 6, 1950 |

OTHER REFERENCES

"Silicone Rubber, a General Electric Development," Rubber Age, vol. 56, No. 2, November 1944, page 174.